(12) United States Patent
Kasperchik et al.

(10) Patent No.: US 12,005,499 B2
(45) Date of Patent: Jun. 11, 2024

(54) THREE-DIMENSIONAL PRINTING WITH MELTING POINT SUPPRESSION AGENTS

(71) Applicant: Hewlett-Packard Development Company, L.P., Spring, TX (US)

(72) Inventors: Vladek Kasperchik, Corvallis, OR (US); Mohammed S. Shaarawi, Corvallis, OR (US); Mackensie C. Smith, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 263 days.

(21) Appl. No.: 17/637,644

(22) PCT Filed: Oct. 15, 2019

(86) PCT No.: PCT/US2019/056319
§ 371 (c)(1),
(2) Date: Feb. 23, 2022

(87) PCT Pub. No.: WO2021/076106
PCT Pub. Date: Apr. 22, 2021

(65) Prior Publication Data
US 2022/0274175 A1   Sep. 1, 2022

(51) Int. Cl.
*B22F 10/14*   (2021.01)
*B22F 10/30*   (2021.01)
(Continued)

(52) U.S. Cl.
CPC ............ *B22F 10/14* (2021.01); *B22F 10/30* (2021.01); *B22F 10/64* (2021.01); *B33Y 10/00* (2014.12);
(Continued)

(58) Field of Classification Search
None
See application file for complete search history.

(56) References Cited

U.S. PATENT DOCUMENTS

| 9,771,629 B2 | 9/2017 | Soloway |
| 2017/0247552 A1 | 8/2017 | Prasad et al. |

(Continued)

FOREIGN PATENT DOCUMENTS

| CN | 104129214 A | 11/2014 |
| CN | 105802257 A | 7/2016 |

(Continued)

*Primary Examiner* — Daniel J. Schleis
(74) *Attorney, Agent, or Firm* — HP Inc. Patent Department (57) ABSTRACT

A three-dimensional printing system can include a particulate build material including metal particles. The three-dimensional printing system can include a binding agent applicator fluidly coupled or coupleable to a binding agent. The three-dimensional printing system can include a suppression agent applicator fluidly coupled or coupleable to a melting point suppression agent, the melting point suppression agent including a dispersion of melting point suppression particles. The three-dimensional printing system can include a hardware controller to generate a command to direct the binding agent applicator to iteratively apply the binding agent to the particulate build material to form individually patterned object layers of a green body object, and direct the suppression agent applicator to iteratively apply the melting point suppression agent to a discrete location of the individually patterned object layers. The discrete location can include a discrete surface region of the green body object.

15 Claims, 2 Drawing Sheets

(51) Int. Cl.
   *B22F 10/64*    (2021.01)
   *B33Y 10/00*    (2015.01)
   *B33Y 30/00*    (2015.01)
   *B33Y 80/00*    (2015.01)

(52) U.S. Cl.
   CPC ............... *B33Y 30/00* (2014.12); *B33Y 80/00* (2014.12); *B22F 2203/11* (2013.01); *B22F 2304/10* (2013.01)

(56) References Cited

U.S. PATENT DOCUMENTS

2019/0030800 A1    1/2019    Rudisill et al.
2019/0160531 A1    5/2019    Yoo et al.

FOREIGN PATENT DOCUMENTS

| | | |
|---|---|---|
| CN | 107812951 A | 3/2018 |
| DE | 102017207184 A1 | 10/2018 |
| FR | 3079517 A1 | 10/2019 |
| JP | 2018-154039 A | 10/2018 |
| WO | 2015/112959 A1 | 7/2015 |

THREE-DIMENSIONAL PRINTING WITH MELTING POINT SUPPRESSION AGENTS

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques are considered additive processes because they involve the application of successive layers of build material. This is unlike other machining processes, which often rely upon the removal of material to create the final part. Some three-dimensional printing methods use chemical binders or adhesives to bind build materials together. Other three-dimensional printing methods involve partial sintering, melting, etc., of the build material. For some three-dimensional printing methods, at least partial melting of build material may be accomplished using heat-assisted extrusion, and for some other materials (e.g., polymerizable materials), curing may be accomplished using, for example, ultra-violet light or infrared light.

DETAILED DESCRIPTION

An example 3-dimensional (3D) printing process can be an additive process that can involve the application of successive layers of build material with chemical binders or adhesives printed thereon to bind the successive layers of build materials together to form a green body object, and then thermal processing, melting, sintering, or the like, can be utilized to subsequently form a fused metal three-dimensional object. More specifically, a binding agent can be selectively applied to a layer of particulate build material on a build platform, followed by applying another layer of particulate build material and binding agent thereon, and so forth to iteratively pattern multiple layers of the particulate build material to form the green body object. The binding agent can include a binder particle, such as latex or other polymer or even a metal-containing component, that can hold the particulate build material of the green body or part together after the build and removal of the green body object from the particulate build material that was not bound together during the printing process. The green body object can then be exposed to heat to fuse, e.g., sinter, anneal, melt, or the like, the particulate build material of the green part together and form a fused three-dimensional printed object that is much more rigid, e.g., a fused metal part or object. However, to move the green body to the fusing oven, the green body does not need to be highly stable or rigid, but rather stable enough to be moved to the oven where it will ultimately be fused without breaking apart or becoming otherwise deformed, for example. As these parts are often fused at very high temperatures, e.g., 600° C. to 3,500° C. depending on the metal particles to be fused, it can be a challenge to mark a surface of the particles, as most materials that may be otherwise useful for marking a part, such as the green body object, may be burned off of the surface during sintering in the fusing oven, for example.

In accordance with this, in one example, a method of three-dimensional printing can include iteratively applying individual build material layers of a particulate build material onto a powder bed, wherein the particulate build material includes from about 80 wt % to 100 wt % metal particles. The method can include iteratively and selectively applying, based on a 3D object model, a binding agent to individual build material layers to define individually patterned object layers that become adhered to one another and form a layered green body object. The method can include iteratively and selectively applying, based on the 3D object model, a melting point suppression agent to individual build material layers at a discrete location of the individually patterned object layers, wherein the melting point suppression agent is a dispersion of melting point suppression particles, and wherein the discrete location is inclusive of a discrete surface region of the layered green body object. The method can include heating the layered green body object to fuse the metal particles together and form a fused three-dimensional object, wherein the melting point suppression agent interacts with the metal particles during the heating and creates a visible mark having increased optical reflectivity at the discrete surface region on the fused three-dimensional object. In one example, the melting point suppression agent, at the location applied, can reduce a local melting temperature of the metal particles in an area containing the melting point suppression agent, and localized melting at the discrete surface region during heating creates the visible mark having the increased optical reflectivity. The melting point suppression particles can include, for example, pigment selected from carbon black pigment, or pigments producing element carbon when heated above a corresponding pyrolysis temperature; a carbon precursor to produce elemental carbon via pyrolysis when heated above its thermal decomposition temperature; metal selected from iron, cobalt, nickel, chromium, manganese, vanadium, tin, zinc, copper, tool steels, ferrous alloys, stainless steels, or an alloy thereof; or any combination of pigment, carbon precursor, metal, or pigment and metal thereof. In yet another example, dispersion of the melting point suppression particles can include a liquid vehicle, wherein the liquid vehicle comprises water, organic co-solvent, and surfactant. In a further example, the discrete location is further defined as having a depth beyond the discrete surface region from about 30 μm to about 500 μm. In yet a further example, the melting point suppression particles can be present within the green body object at the discrete location at an average melting point suppression particle to metal particle weight ratio from about 0.05:100 to about 1:10. In one aspect, the layered green body object may be heated to a temperature from about 600° C. to about 3,500° C. to fuse the metal particles together and form the fused three-dimensional object. In another aspect, the metal particles can have a D50 particle size from about 3 μm to about 150 μm, and the melting point fusing particles have a D50 particle size from about 2 nm to about 1,000 nm. In yet another aspect, the metal particles can include iron, aluminum, titanium, copper, cobalt, chromium, nickel, vanadium, tungsten, tungsten carbide, tantalum, molybdenum, magnesium, tool steels, ferrous alloys, stainless steels, an alloy thereof, or a mixture thereof.

In another example, a three-dimensional printing system can include a particulate build material including from about 80 wt % to 100 wt % metal particles having a particle size from about 3 µm to about 150 µm. In an example, the three-dimensional printing system includes a binding agent applicator fluidly coupled or coupleable to a binding agent, wherein the binding agent includes a binder in an aqueous binder vehicle. The three-dimensional printing system can also include a suppression agent applicator fluidly coupled or coupleable to a melting point suppression agent, the melting point suppression agent including a dispersion of melting point suppression particles. The three-dimensional printing system can include a hardware controller to generate a command to direct the binding agent applicator to iteratively apply the binding agent to the particulate build material to form individually patterned object layers of a green body object, and direct the suppression agent applicator to iteratively apply the melting point suppression agent to a discrete location of the individually patterned object layers, wherein the discrete location corresponds to a discrete surface region of the green body object. The three-dimensional printing system can include a fusing oven to heat the layered green body object and form a fused three-dimensional object, wherein the melting point suppression agent interacts with the metal particles during heating to form a visible mark at a surface of the fused three-dimensional object having increased optical reflectivity compared to other surface locations where the melting point suppression agent was not applied while forming the green body object. In a further example, the discrete location of the individually patterned object layers extends beyond the discrete surface region to within a bulk of the green body object to a depth from about 30 µm to about 500 µm. In yet another further example, the metal particles include stainless steel and the melting point suppression particles include carbon black pigment.

In another example, a metal article can include a sintered metal particle body of a first metal material. The metal article can include a metal surface of the sintered metal particle body. The metal surface can include a first sintered surface portion of the first metal material. The metal surface can include a second sintered surface portion including a melting point suppressed-sintered alloy of the first metal material and melting point suppression particles, wherein the second sintered surface portion has a higher optical reflectivity than the first surface portion. As a further example, the sintered metal particle body further includes a discrete location with the melting point suppressed-sintered alloy therein, wherein the melting point suppressed-sintered alloy is positioned directly adjacent to the second sintered surface portion and has a depth therefrom ranging from 30 µm to 500 µm.

It is noted that when discussing the method of three-dimensional printing, the three-dimensional printing system, and/or the metal article herein, these discussions can be considered applicable to one another whether or not they are explicitly discussed in the context of that example. Thus, for example, when discussing a binder agent related to a three-dimensional printing system, such disclosure is also relevant to and directly supported in the context of methods of three-dimensional printing, sintered articles, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Methods of Three-Dimensional Printing

Figure 1:
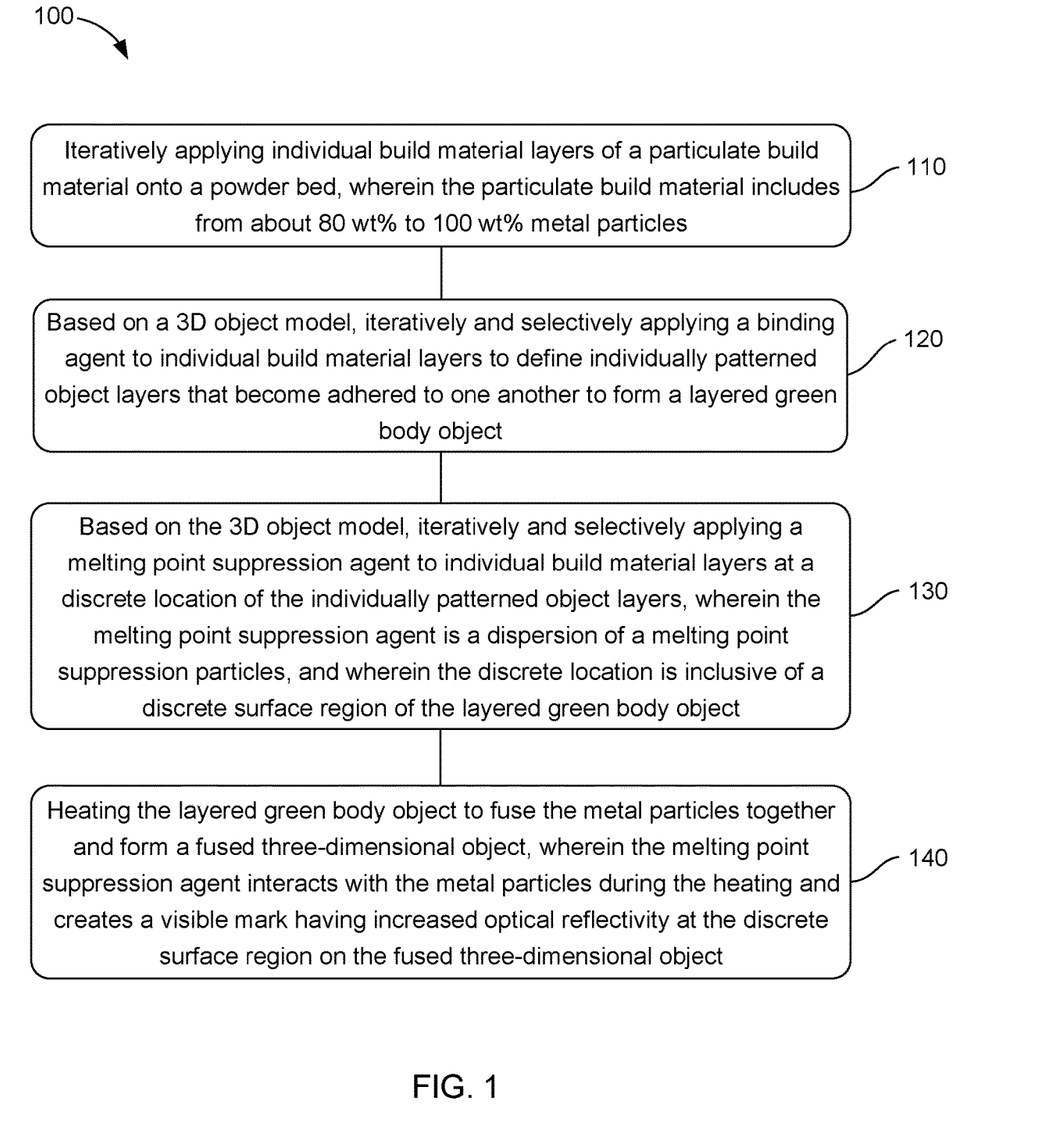
FIG. 1 is a flow diagram illustrating an example method of three-dimensional printing in accordance with the present disclosure FIG. 2 schematically illustrates an example three-dimensional printing system in accordance with the present disclosure.

In one example, as shown in FIG. 1, a method 100 of three-dimensional printing can include iteratively applying 110 individual build material layers of a particulate build material onto a powder bed, wherein the particulate build material includes from about 80 wt % to 100 wt % metal particles. The method can further include iteratively and selectively applying 120, based on a 3D object model, a binding agent to individual build material layers to define individually patterned object layers that become adhered to one another and form a layered green body object. The method can further include iteratively and selectively applying 130, based on the 3D object model, a melting point suppression agent to individual build material layers at a discrete location of the individually patterned object layers, wherein the melting point suppression agent is a dispersion of melting point suppression particles, and wherein the discrete location is inclusive of a discrete surface region of the layered green body object. The method can further include heating 140 the layered green body object to fuse the metal particles together and form a fused three-dimensional object, wherein the melting point suppression agent interacts with the metal particles during the heating and creates a visible mark having increased optical reflectivity at the discrete surface region on the fused three-dimensional object.

In one example, the melting point suppression agent, at the location applied, can reduce a local melting temperature of the metal particles in an area containing the melting point suppression agent, and localized melting at the discrete surface region during heating can create the visible mark having the increased optical reflectivity. In another example, the melting point suppression particles included in the melting point suppression agent can include pigment selected from carbon black pigment, or pigments producing element carbon when heated above a corresponding pyrolysis temperature; metal selected from iron, cobalt, nickel, chromium, manganese, vanadium, tin, zinc, copper, tool steels, ferrous alloys, stainless steels, or an alloy thereof; or any combination of pigment, metal, or pigment and metal thereof. In yet another example, the dispersion of the melting point suppression particles can include a liquid vehicle, where the liquid vehicle can include water, organic co-solvent, and surfactant.

In one example, the metal particles can include iron, aluminum, titanium, copper, cobalt, chromium, nickel, vanadium, tungsten, tungsten carbide, tantalum, molybdenum, magnesium, tool steels, ferrous alloys, stainless steels, an alloy thereof, or a mixture thereof. In another example, the metal particles can have a D50 particle size from about 3 µm to about 150 µm, and the melting point fusing particles can have a D50 particle size from about 2 nm to about 1,000 nm. In yet another example, the melting point suppression particles can be present within the green body object at the discrete location at an average melting point suppression particle to metal particle weight ratio from about 0.05:100 to about 1:10.

In one example, the melting point suppression agent can be applied to the individual build material layers at the discrete location of the individually patterned object layers, where the discrete location can have a depth beyond the discrete surface region from about 30 µm to about 500 µm. In other words, the melting point suppression agent can be applied to "surface regions" of the layered green body object with relatively minimal depths into the body of the layered green body object.

As an example, a melting temperature of various metals and metal alloys can be altered by adding to them a relatively small amount of an elemental additive capable of forming solutions or intermetallic compounds with a base metal component. For example, the addition of relatively small amounts of carbon (less than about 3 wt %, or even less than about 1 wt % of a total mix) can lower a melting temperature of the resulting mix. Thus, a patterning of an iron or ferrous alloy (such as steel) powder surface with a fluid containing carbon black particles can locally depress a powder melting point. During a printing process, a surface (or surface layers) of a green body object can be digitally patterned with a suitable patterning component, such as a dispersion of carbon black particles, and such a component is capable of reacting with a base metal such as ferrous alloy (or steel) and reducing locally its melting temperature. During a sintering process of the green body object, the carbon black particles can react with the ferrous alloy and depress locally the melting temperature, where localized melting of patterned surface areas can change an optical reflectivity and create a visible mark. The localized melting of the patterned surface areas can affect metal particle surface reflectivity, and hence, a visual appearance. In other words, the localized melting of the patterned surface areas corresponding to the carbon black particles can have an increased amount of optical reflectivity (or shininess, glow, etc.) and cause the visible mark to appear on a sintered three-dimensional metal object. As a non-limiting example, the visible mark can be an identification mark on a surface of the sintered three-dimensional metal object. Further, by adding the carbon black particles to the surface of the green body object, the visible mark can be created without altering a geometry of the green body object, thereby resulting in a sintered three-dimensional metal object having an increased mechanical strength.

Following application of the binding agent and the melting point suppression agent, the particulate build material and fluid(s) applied thereto can be heated to an elevated temperature to assist with solidifying the three-dimensional green body object in preparation for moving to a fusing oven. In one example, heating can be carried out at from about 100° C. to about 250° C., about 120° C. to about 220° C., or about 150° C. to about 200° C. for time sufficient to solidify or stabilize the green body for movement to a fusing oven. Time frames for heating individual layers may be short, e.g., from about 0.5 second to about 120 seconds, for example. In heating the green body after it is fully formed, time frames can vary as well, depending on size of the green body, e.g., large objects with a smaller surface to volume ratio may take longer to drive off enough fluid to stabilize the green body than a smaller object with a larger surface to volume ratio. That stated, time frames for heating the green body after formation can be from about 10 minutes to about 8 hours, or from about 30 minutes to about 3 hours. In many cases, individual layers can be heated during the build, and furthermore, additional heating can occur after the green body is fully formed. In other words, one goal may be to generate a green body object that is stable enough to move after formation to a fusing oven.

Upon coalescing or otherwise binding of the particulate build material by the binding agent, the three-dimensional green body object can be moved to a heating device, such as a fusing oven. In one example, the heating can be a temperature ranging from about 600° C. to about 3,500° C., including at a temperature within the range where the metal particles are fused together. In another example, the temperature can range from about 600° C. to about 1,500° C., or from about 800° C. to about 1300° C. In further detail, the fusing temperature range can vary, depending on the material, but in one example, the fusing temperature can range from about 10° C. below the melting temperature of the metal particles of the particulate build material to about 50° C. below the melting temperature of the metal particles of the particulate build material. In another example, the fusing temperature can range from about 100° C. below the melting temperature of the metal particles of the particulate build material to about 200° C. below the melting temperature of the metal particles of the particulate build material. The fusing temperature can depend upon the particle size and period of time that heating occurs, e.g., at a high temperature for a sufficient time to cause particle surfaces to become physically merged or composited together. For example, a fusing temperature for stainless steel can be about 1400° C. and an example of a fusing temperature for aluminum or aluminum alloys can range from about 550° C. to about 620° C. Temperatures outside of these ranges can be used as determined on a case by case basis.

During heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof. Upon removal of the fused three-dimensional object from the oven and cooling (or annealing by controlling the cool down rate in the oven), the fused three-dimensional object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

Three-Dimensional Printing Systems

Figure 2:
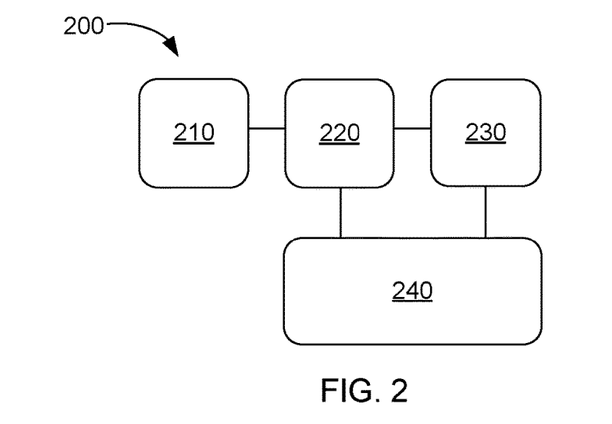

In another example, a three-dimensional printing system 200 can include a particulate build material 210 including from about 80 wt % to 100 wt % metal particles having a particle size from about 3 µm to about 150 µm. The metal particles can include iron, aluminum, titanium, copper, cobalt, chromium, nickel, vanadium, tungsten, tungsten carbide, tantalum, molybdenum, magnesium, tool steels, ferrous alloys, stainless steels, an alloy thereof, or a mixture thereof, for example. The three-dimensional printing system can also include a binding agent applicator 220 fluidly coupled or coupleable to a binding agent. The binding agent can include an aqueous binder vehicle and binder particles, such as polymer or metal-containing particles, which act to bind the particulate build material together. The three-dimensional printing system can include a suppression agent applicator 230 fluidly coupled or coupleable to the melting point suppression agent. In one example, the melting point suppression agent is a dispersion of melting point suppression particles, such as a pigment selected from carbon black pigment, or pigments producing element carbon when heated above a corresponding pyrolysis temperature. In one example, instead of carbon-based pigments, the melting point suppression agent can be provided by a dispersion or solution of a carbon precursor that can produce elemental carbon via pyrolysis when heated above its thermal decomposition temperature. In other examples, the melting point suppression particles can include metal selected from iron, cobalt, nickel, chromium, manganese, vanadium, tin, zinc, copper, tool steels, ferrous alloys, stainless steels, or an alloy thereof. In yet another example, the melting point suppression particles can include any combination of pigment, metal, or pigment and metal thereof. As a non-limiting specific example, the metal particles can be stainless steel and the melting point suppression particles can include carbon black pigment, for example.

The three-dimensional printing system can also include a hardware controller 240. The hardware controller can generate a command to direct the binding agent applicator 220 to iteratively apply the binding agent to the particulate build material to form individually patterned object layers of a green body object. Furthermore, the hardware controller can generate a command to direct the suppression agent applicator 230 to iteratively apply the melting point suppression agent to a discrete location of the individually patterned object layers, where the discrete location can correspond to a discrete surface region of the green body object. In one example, the discrete location of the individually patterned object layers can extend beyond the discrete surface region to within a bulk of the green body object to a depth from about 30 μm to about 500 μm.

In one example, the layered green body object can be heated in a fusing oven to form a fused three-dimensional object. For example, the layered green body object can be heated to a temperature from about 600° C. to about 3,500° C. to fuse the metal particles together to form the fused three-dimensional object. The melting point suppression agent can interact with the metal particles during heating to form a visible mark at a surface of the fused three-dimensional object having increased optical reflectivity compared to other surface locations where the melting point suppression agent was not applied while forming the green body object.

Figure 3:
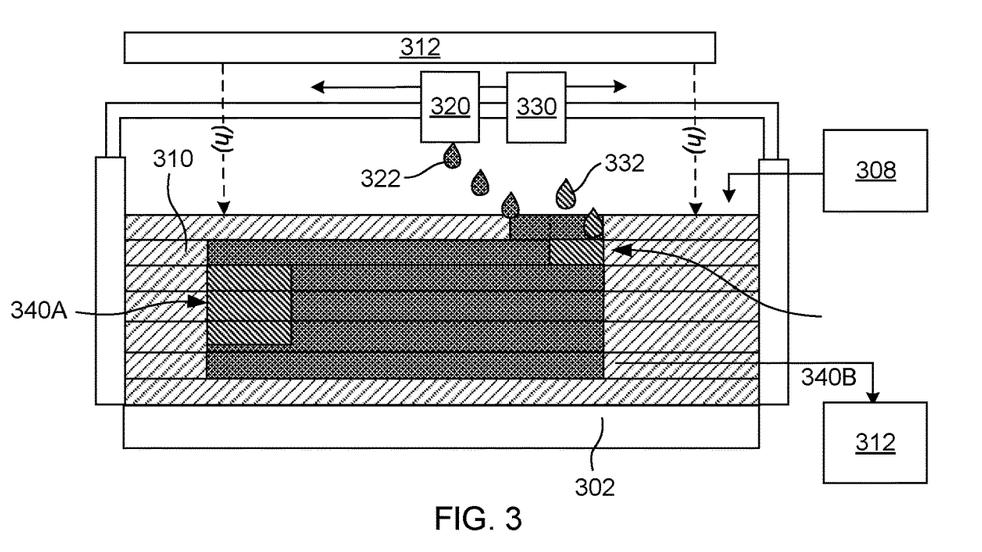
FIG. 3 graphically illustrates an example three-dimensional printing system in use in accordance with the present disclosure.

In FIG. 3, a portion of the three-dimensional printing system as it relates to building a green body object in accordance with the methods of the present disclosure. There, a particulate build material 310 including metal particles is deposited from a particulate build material source 308 onto a build platform 302 where it can be flattened or smoothed, such as by a mechanical roller or other flattening technique. Individual build material layers of the particulate build material can be iteratively applied onto a powder bed. In this example, a binding agent 322 can be iteratively and selectively applied onto individual build material layers from a binding agent applicator 320, for example, to define individually patterned object layers that become adhered to one another to form a layered green body object. The binding agent can be iteratively and selectively applied to the individual build material layers based on a 3D object model or computer model. Further, in this example, a melting point suppression agent 332 can be iteratively and selectively applied from a suppression agent applicator 330, for example, to end portions of individual build material layers at a discrete location inclusive of a discrete surface region 340A, 340B of the individually patterned object layers (or anywhere along the top layer or the bottom layer that will ultimately become a part of the outer surface of the fused three-dimensional object). The melting point suppression agent can be a dispersion of melting point suppression particles, and the discrete location can be inclusive of a discrete surface region of the layered green body object. Further, the discrete location can have a depth beyond the discrete surface region from about 30 μm to about 500 μm. In other words, the discrete location of the individually patterned object layers can extend beyond the discrete surface region to within a bulk of the green body object to a depth from about 30 μm to about 500 μm. In the example shown, the discrete surface region at 340A is deeper within the body of the green body object than the discrete surface region at 340B.

In one example, heat (h) can be used, such as from a heat source 312, at the various layers (or group of layers, or after the three-dimensional green body object is formed) to remove solvent from the binding agent 322, which can assist with more rapid solidification of individual layers. In one example, heat can be applied from overhead, e.g., prior to application of the next layer of particulate build material 310, or after multiple layers are formed, etc.), and/or can be provided by the build platform 302 from beneath the particulate build material and/or from the particulate build material source (preheating particulate build material prior to dispensing on the build platform or previously applied three-dimensional object layer). After individual layers are printed with a binding agent and/or a melting point suppression agent 332, the build platform can be dropped a distance that may correspond to the thickness of a printed layer in one example, so that another layer of the particulate build material can be added thereon and printed with the binding agent, the melting point suppression agent, etc. The process can be repeated on a layer by layer basis until a green body is formed that is stable enough to move to an oven suitable for fusing, e.g., sintering, annealing, melting, or the like. The green body in this example includes a three-dimensional object formed from solidified green body object layers.

The binding agent applicator 320 and the suppression agent applicator 330 can deposit fluid(s) in a layer that corresponds to the layers of the three-dimensional object, and can be used to form a green body three-dimensional object in any orientation. For example, the three-dimensional object can be printed from bottom to top, top to bottom, on its side, at an angle, or any other orientation. The orientation of the three-dimensional object can also be formed in any orientation relative to the layering of the particulate build material. For example, the three-dimensional object can be formed in an inverted orientation or on its side relative to the build layering within the particulate build material. The orientation of build or the orientation of the three-dimensional object to be built within the particulate build material can be selected in advance or even by the user at the time of printing, for example.

In one example, the layered green body object can be removed from the particulate build material not used to form the green body object, and then can be placed in a fusing oven 312 to fuse the metal particles together to form a fused three-dimensional object. The melting point suppression agent 332 can interact with the metal particles during the heating and create a visible mark having increased optical reflectivity at the discrete surface region on the fused three-dimensional object. The melting point suppression agent, at the location applied, can reduce a local melting temperature of the metal particles in an area containing the melting point suppression agent, and localized melting at the discrete surface region during heating can create the visible mark having the increased optical reflectivity. In one example, the melting point suppression particles can be present within the layered green body object at the discrete location at an average melting point suppression particle to metal particle weight ratio from about 0.05:100 to about 1:10.

Metal Article

Figure 4:
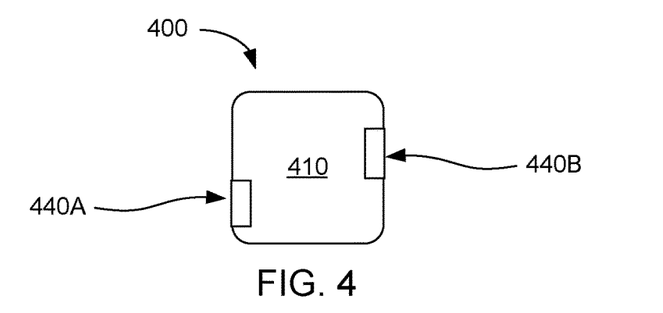
FIG. 4 illustrates an example metal article in accordance with the present disclosure.

Referring now to FIG. 4, an example of a metal article 400 is shown. The metal article can be formed using the method and/or systems shown and described in FIGS. 1-3, for example. The metal article can include first sintered metal particles 410 of a first metal material. The first metal material can include iron, aluminum, titanium, copper, cobalt, chromium, nickel, vanadium, tungsten, tungsten carbide, tantalum, molybdenum, magnesium, tool steels, ferrous alloys, stainless steels, an alloy thereof, or a mixture thereof. The metal article can also include second sintered metal particles at a surface portion 440A, 440B, which may be an alloy of the first metal material and the melting point suppression particles applied to these surface regions using the melting point suppression agent. Thus, these surface portions can further include, for example, pigment selected from carbon black pigment, or pigments producing element carbon when heated above a corresponding pyrolysis temperature; metal selected from iron, cobalt, nickel, chromium, manganese, vanadium, tin, zinc, copper, tool steels, ferrous alloys, stainless steels, or an alloy thereof; or any combination of pigment, metal, or pigment and metal thereof. The melting point suppression particles can be selected to lower the melting point of the blend at these locations. When sintered and removed, because the melting point at these surface locations were reduced, the second sintered surface portion can have a higher optical reflectivity than the first surface portion, as this material may have undergone more melting or flow than at the other fused three-dimensional object regions, including other surface regions where the melting point suppression agent was not applied. In one example, the sintered metal particle body can include a discrete location with the sintered alloy therein. The sintered alloy of the second sintered surface portion can be positioned directly adjacent to the first sintered surface portions that do not included the melting point suppression particles. The second sintered surface portion can be printed to have a depth from the surface ranging from 30 µm to 500 µm, for example. It is noted that the term "sintered alloy" in this context can be used to describe the alloy of the first metal material of the particulate build material that becomes alloyed with the melting point suppression particles, which is the alloy that forms the discretion surface portions that may be shinier that other portions. However, it is noted that the other portions of the surface (that do not include the melting point suppression particles) may also be formed of alloy. For example, stainless steel particles are actually also an metal alloy, but they are not an alloy of the stainless steel particles and the melting point suppression particles. Thus, in some examples, the "sintered alloy" in this context may be referred to on occasion as a "melting point suppressed-sintered alloy."

Particulate Build Materials

In examples of the three-dimensional printing kits and methods disclosed herein, the build material can include any particulate build material that includes from about 80 wt % to 100 wt % metal particles based on the total weight of the particulate build material. In other examples, the metal particles can be present in the particulate build material at from about 90 wt % to 100 wt %, from about 95 wt % to 100 wt %, or at about 100 wt %. In an example, the build material particles are a single phase metallic material composed of one element. In this example, the fusing temperature may be below the melting point of the single element. In another example, the build material particles are composed of two or more elements, which may be in the form of a single phase metallic alloy or a multiple phase metallic alloy. In these other examples, fusing generally occurs over a range of temperatures. With respect to alloys, materials with a metal alloyed to a non-metal (such as a metal-metalloid alloy) can be used as well.

In some examples, the particulate build material can include particles of iron, aluminum, titanium, copper, cobalt, chromium, nickel, vanadium, tungsten, tungsten carbide, tantalum, molybdenum, magnesium, tool steels, ferrous alloys, stainless steels, an alloy thereof, or a mixture thereof. Specific alloy examples can include AlSi 10 Mg, 2xxx series aluminum, 4xxx series aluminum, CoCr MP1, CoCr SP2, maraging steel MS1, hastelloy C, hastelloy X, nickel alloy HX, inconel IN625, inconel IN718, stainless steel GP1, stainless steel 17-4PH, stainless steel 316L, stainless steel 430L titanium 6Al4V, and titanium 6Al-4V ELI7.

The temperature(s) at which the metallic particles of the particulate build material fuse together is/are above the temperature of the environment in which the patterning portion of the three-dimensional printing method is performed, e.g., patterning at from about 18° C. to about 300° C. and fusing at from about 600° C. to about 3,500° C. In some examples, the metallic build material particles may have a melting point ranging from about 600° C. to about 3,500° C. In other examples, the metallic build material particles may be an alloy having a range of melting points.

The particle size of the particulate build material can be similarly sized or differently sized. In one example, the D50 particle size of the particulate build material can range from about 3 µm to about 150 µm. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material). As used herein, particle size refers to the value of the diameter of spherical particles or in particles that are not spherical can refer to the longest dimension of that particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range).

That being stated, an example Gaussian-like distribution of the metal particles can be characterized generally using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of 25 µm means that 50% of the particles (by number) have a particle size greater than 25 µm and 50% of the particles have a particle size less than 25 µm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be essentially referred to as "Gaussian." The shape of the particles of the particulate build material can be spherical, non-spherical, random shapes, or a combination thereof.

Binding Agents

In further detail, regarding the binding agent that may be present in the three-dimensional (3D) printing kit, three-dimensional printing system, or utilized in a method of three-dimensional printing as described herein, the binding agent can include an aqueous liquid vehicle and binder, e.g., latex particles, metal-containing binder, etc., to bind the particulate build material together during the build process to form a three-dimensional green body object. The term "binder" can include material used to physically bind separate metal particles together or facilitate adhesion to a surface of adjacent metal particles to form the green part or three-dimensional green body object in preparation for subsequent fusing, sintering, or annealing. During three-dimensional printing, a binding agent can be applied to the particulate build material on a layer by layer basis and can move into vacant spaces between particles of the particulate build material. The binding agent can provide binding to the particulate build material upon application, or in some instances, can be further treated after printing to provide binding properties, e.g., exposure to IR energy to evaporate volatile species, exposure to flash heating (photo energy and heat) to activate a metal-containing reducing agent, exposure to UV or IR energy to initiate polymerization, or the like.

In one example, the binder can be a polymer binder or a polymerizable binder. In one example, the polymer binder or polymerizable binder can be present at from about 2 wt % to about 50 wt %, from about 10 wt % to about 25 wt %, from about 3 wt % to about 20 wt %, from about 5 wt % to about 15 wt %, from about 25 wt % to about 50 wt %, from about 20 wt % to about 40 wt %, or from about 5 wt % to about 20 wt % in the binding agent. As mentioned, in some examples, the polymer binder or polymerizable binder can include latex particles. The latex particles can have a D50 particle size that can range from about 10 μm to about 250 μm and can be dispersed in the aqueous liquid vehicle. The latex particles can include polymerized monomers of vinyl, vinyl chloride, vinylidene chloride, vinyl ester, functional vinyl monomers, acrylate, acrylic, acrylic acid, hydroxyethyl acrylate, methacrylate, methacrylic acid, styrene, substituted methyl styrenes, ethylene, maleate esters, fumarate esters, itaconate esters, α-methyl styrene, p-methyl styrene, methyl (meth)acrylate, hexyl acrylate, hexyl (meth)acrylate, butyl acrylate, butyl (meth)acrylate, ethyl acrylate, ethyl (meth)acrylate, propyl acrylate, propyl (meth)acrylate, 2-ethylhexyl acrylate, 2-ethylhexyl (meth)acrylate, isodecyl (meth) acrylate, octadecyl acrylate, octadecyl (meth)acrylate, stearyl (meth)acrylate, vinylbenzyl chloride, isobornyl acrylate, isobornyl (meth)acrylate, tetrahydrofurfuryl acrylate, tetrahydrofurfuryl (meth)acrylate, 2-phenoxyethyl (meth)acrylate, benzyl (meth)acrylate, benzyl acrylate, ethoxylated nonyl phenol (meth)acrylate, isobornyl (meth) acrylate, cyclohexyl (meth)acrylate, trimethyl cyclohexyl (meth)acrylate, t-butyl (meth)acrylate, n-octyl (meth)acrylate, lauryl (meth)acrylate, tridecyl (meth)acrylate, alkoxylated tetrahydrofurfuryl acrylate, alkoxylated tetrahydrofurfuryl (meth)acrylate, isodecyl acrylate, isobornyl methacrylate, isobornyl acrylate, dimethyl maleate, dioctyl maleate, acetoacetoxyethyl (meth)acrylate, diacetone acrylamide, diacetone (meth)acrylamide, N-vinyl imidazole, N-vinylcarbazole, N-vinyl-caprolactam, combinations thereof, derivatives thereof, or mixtures thereof.

In other examples, the latex particles can include acidic monomers that can be polymerized such as acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, sodium 1-allyloxy-2-hydroxypropane sulfonate, combinations thereof, derivatives thereof, or mixtures thereof.

In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

The binder can be dispersed in an aqueous liquid vehicle suitable for jetting. In one example, the aqueous liquid vehicle, can include water as a major solvent, e.g., the solvent present at the highest concentration when compared to other co-solvents. The aqueous liquid vehicle can be present in the binding agent at from about 20 wt % to about 98 wt %, from about 70 wt % to about 98 wt %, from about 50 wt % to about 90 wt %, or from about 25 wt % to about 75 wt %.

Apart from water, the aqueous liquid vehicle can further include from about 0.1 wt % to about 50 wt % of other liquid components. The other liquid components can include organic co-solvents, co-polymerizable surfactants, additives that inhibit growth of harmful microorganisms, viscosity modifiers, pH adjusters, sequestering agents, surfactants, preservatives, etc.

When present, organic co-solvent(s) can include high-boiling solvents and/or humectants, e.g., aliphatic alcohols, aromatic alcohols, alkyl diols, glycol ethers, polyglycol ethers, 2-pyrrolidinones, caprolactams, formamides, acetamides, long chain alcohols, or mixtures thereof. The organic co-solvent(s) in aggregate can comprise from 0 wt % to about 50 wt % of the binding agent. In other examples, organic co-solvents can be present at from about 5 wt % to about 25 wt %, from about 2 wt % to about 20 wt %, or from about 10 wt % to about 30 wt % of the binding agent.

When present, the co-polymerizable surfactant can include polyoxyethylene alkylphenyl ether ammonium sulfate, sodium polyoxyethylene alkylether sulfuric ester, polyoxyethylene styrenated phenyl ether ammonium sulfate, or mixtures thereof Some example additives that can inhibit the growth of harmful microorganisms can include biocides, fungicides, and other microbial agents. Commercially available examples can include ACTICIDE® (Thor Specialties, Inc., U.S.A.), NUOSEPT® (Troy, Corp. U.S.A), UCARCIDE™ (The Dow Chemical Company, U.S.A.), VANCIDE® (Vanderbilt Chemicals, LLC, U.S.A.), PROXEL® (Lonza America, Inc., U.S.A.), and combinations thereof.

In some examples, the binding agent can have a pH that can range from about 6 to about 10. In yet other examples, the binding agent can have a pH that can range from about 6.5 to about 9, from about 6.5 to about 8, from about 6.6 to about 8, from about 6.8 to about 8, from about 7 to about 9, or from about 7 to about 8. A pH adjustor can be added to the aqueous liquid vehicle in order to adjust the pH to a pH ranging from about 6.5 to about 9.

When applied to a layer of the particulate build material, the aqueous liquid vehicle can be capable of wetting the particulate build material and the binder can be capable of penetrating into microscopic pores of the layer (e.g. the spaces between the metal particles of the particulate build material). The binder can be activated or cured by heating the binder, (which may be accomplished by heating an entire layer of the particulate build material on at least a portion of which the binding agent has been selectively applied) to about the glass transition temperature of the polymer binder or polymerizable binder. When activated or cured, the binding agent can form an at least substantially continuous network gluing the metal particles of the particulate build material together and can form a three-dimensional green body object or a printed layer of the three-dimensional green body object. The three-dimensional green body object can have the mechanical strength to withstand extraction from a powder bed and can be sintered or annealed to form a three-dimensional printed object. In some examples, the binder contained in the binding agent can undergo a pyrolysis or burnout process where the binder may be removed during sintering or annealing. This can occur where the thermal energy applied to a three-dimensional green body part or object removes inorganic or organic volatiles and/or other materials that may be present either by decomposition or by burning the binding agent.

Melting Point Suppression Agents

Regarding a melting point suppression agent that may be present in the three-dimensional (3D) printing kit, three-dimensional printing system, or utilized in a method of three-dimensional printing as described herein, the melting point suppression agent can be a dispersion of melting point suppression particles. The dispersion of the melting point suppression particles can include a liquid vehicle, where the liquid vehicle can include water, organic co-solvent, etc., e.g., surfactant, biocide, etc.

In one example, the melting point suppression particles can include pigment selected from carbon black pigment, or pigments producing element carbon when heated above a corresponding pyrolysis temperature. In another example, the melting point suppression particles can be provided b a dispersion or solution of a carbon precursor that produces elemental carbon via pyrolysis when heated above its thermal decomposition temperature. In another example, the melting point suppression particles can include metal selected from iron, cobalt, nickel, chromium, manganese, vanadium, tin, zinc, copper, tool steels, ferrous alloys, stainless steels, or an alloy thereof. In yet another example, the melting point suppression particles can include any combination of pigment, metal, or pigment and metal thereof.

The particle size of the melting point suppression particles can be similarly sized or differently sized. In one example, the D50 particle size of the melting point suppression particles can range from about 2 nm to about 1,000 nm. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material).

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

"Green," when referring to a green body object or green body object layer, etc., refers to any intermediate structure that has been solidified and/or cured (prior to heat fusing), and can include metal particles printed in conjunction with fusing agent and melting-point suppressing agent at a surface of the green body object in accordance with the present disclosure. Thus, the term "green body" generally is used to refer to a multi-layered object that is (weakly) bound together, but upon some water removal, can exhibit sufficient tensile strength to be moved to a fusing oven, for example. Once the green part or three-dimensional green body object is sintered or annealed, the part or object can be referred to as a fused three-dimensional part or object, for example.

"Fuse," "fusing," "fusion," or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another.

"Sintering" refers to the consolidation and physical bonding of the metal particles together (after temporary binding using the binding agent) by solid state diffusion bonding, partial melting of metal particles, or a combination of solid state diffusion bonding and partial melting. With sintering, often adjacent metal particles can form form material bridges between particles at or near points of contact with one another.

"Anneal" refers to a heating and cooling sequence that controls the heating process and the cooling process, e.g., slowing cooling in some instances to remove internal stresses and/or toughen the sintered part or object (or "fused" part). Annealing can be used in conjunction with sintering process where there is also controlled cooling, for example.

"Three-dimensional part," "three-dimensional object," or the like, refers to the target three-dimensional object that is being built, and can be a green body three-dimensional object or a fused three-dimensional object, depending on the context. However, in some instances, for clarity, the three-dimensional object can be referred to as a "fused" three-dimensional object, indicating it has been fused, e.g., sintered, annealed, melted, etc., or a "green body," "three-dimensional green body object," or "green" three-dimensional object, indicating it has been solidified or is in the process of solidification sufficient for movement, but not yet heat fused.

"D50" particle size can be defined as the particle size at which about half of the particles are larger than the D50 particle size and about half of the other particles are smaller than the D50 particle size (by weight based on the metal particle content of the particulate build material). As used herein, particle size can be based on volume of the particles, normalized to a spherical shape of the same volume for diameter measurement, for example. Particle size can be collected using a Malvern Zetasizer, for example. Particle size information can also be determined and/or verified using a scanning electron microscope (SEM).

"Binding agent" refers to a fluid that includes water and binder particles, which can be any particles that can be used to bind the particulate build material together when forming a green body. The binding agent is typically applied to form a three-dimensional green body object.

"Melting point suppression agent" refers to a fluid that includes a dispersion of melting point suppression particles that, when applied to a discrete location, reduces a local melting temperature of metal particles in an area containing the melting point suppression agent, and localized melting at the discrete location during fusing creates a visible mark having an increased optical reflectivity. The discrete location can include a discrete surface region of a layered green body object and can extend to within a depth of the three-dimensional object or part that is from very thin (as thinly as may be applied based on equipment and formulations used, to as thick as may be designed or desired for a particular application.

"Fluid" does not infer that the composition is free of particulate solids, but rather, typically includes dispersed solids, including carbon black pigment, metal particles, latex particles, or other solids that are dispersed in the liquid vehicle of the particular fluid.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as if each numerical value and sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Three-Dimensional Fused Metal Objects with Smooth and Shiny Markings Three-dimensional green parts were printed using a particulate build material including 316L (22 µm) stainless steel particles and a melting point suppression agent including carbon black particles. A binding agent was also applied throughout the green body object on a layer-by-layer basis to provide sufficient strength to move the green body object to a fusing oven. For a first printed three-dimensional green part, a localized concentration of carbon black particles in the stainless steel power was applied at a surface of the green part at 0.25 wt % to a depth from the surface of about 200 µm. For a second printed three-dimensional green part, a localized concentration of carbon black particles in the stainless steel powder was applied at a surface of the green part at about 0.5 wt % to a depth from the surface of about 150 µm. The carbon black particles, with respect to the 0.25 wt % and the 0.5 wt % concentrations within the stainless steel powder. The first and second printed three-dimensional green parts were printed using an HP three-dimensional test printer. The first and second printed three-dimensional green parts (or patterned three-dimensional green parts) were then sintered in a furnace at 1380° C. for 2 hours in a hydrogen atmosphere, thereby creating a first fused three-dimensional metal part and a second fused three-dimensional metal part, respectively. With respect to the first fused three-dimensional metal part, the addition of 0.25 wt % of carbon black particles appeared to have locally depressed a melting point of the stainless steel particles, which caused partial melting of a patterned area and produced a smoother and shinier metal surface as compared to the three-dimensional metal part at locations where carbon black particles were not introduced, with these surface area having a matte surface. With respect to the second three-dimensional metal part, the addition of 0.5 wt % of carbon black particles appeared to have locally depressed a melting point of the stainless steel particles, which caused a complete melting and recrystallization of the patterned area and produced an even smoother and more reflective metal surface as compared to other surface areas of the three-dimensional metal part without carbon black particles.

Example 2—Preparation of Three-Dimensional Fused Metal Objects with Smooth and Shiny Markings A three-dimensional green part was printed using a particulate build material including 316L (22 µm) stainless steel particles and a melting point suppression agent including carbon black particles. The three-dimensional green part was printed using an acrylic latex-containing binding agent. The carbon black patterning fluid was applied to a surface of the three-dimensional green part (surface may include either the uppermost or lowermost layer of the green body object, or may include end regions of the various layers positioned between the uppermost and lowermost layers of the green body object. The carbon black patterning fluid included 23 wt % 1-(2-Hydroxyethyl)-2-pyrrolidone, 66.67 wt % Cab-O-Jet 300, 0.40 wt % Surfynol 465, and 9.93 wt % water. The three-dimensional green part was printed using an HP three-dimensional test printer. The binding agent-patterned three-dimensional green part, with melting point suppression agent applied at a surface thereof, was then sintered in a furnace at 1380° C. for 2 hours in an argon atmosphere, thereby creating a fused three-dimensional metal part. The areas of the three-dimensional metal part that were patterned with the carbon black patterning fluid appeared to have a higher reflectivity and appeared "shinier" than a three-dimensional metal part without the carbon black patterning fluid, which exhibited a surface with more of a matte finish. The areas of the three-dimensional metal part that were patterned with the carbon black patterning fluid left visually distinguishable marks without much, if any, alteration of the printed part geometry.

What is claimed is:

1. A method of three-dimensional printing comprising:
iteratively applying individual build material layers of a particulate build material onto a powder bed, wherein the particulate build material includes from about 80 wt % to 100 wt % metal particles;
based on a 3D object model, iteratively and selectively applying a binding agent to individual build material layers to define individually patterned object layers that become adhered to one another to form a layered green body object;
based on the 3D object model, iteratively and selectively applying a melting point suppression agent to individual build material layers at a discrete location of the individually patterned object layers, wherein the melting point suppression agent is a dispersion of a melting point suppression particles, and wherein the discrete location is inclusive of a discrete surface region of the layered green body object; and
heating the layered green body object to fuse the metal particles together to form a fused three-dimensional object, wherein the melting point suppression agent interacts with the metal particles during the heating and creates a visible mark having increased optical reflectivity at the discrete surface region on the fused three-dimensional object.

2. The method of claim 1, wherein the melting point suppression agent, at the location applied, reduces a local melting temperature of the metal particles in an area containing the melting point suppression agent, and localized melting at the discrete surface region during heating creates the visible mark having the increased optical reflectivity.

3. The method of claim 1, wherein the melting point suppression particles include:
pigment selected from carbon black pigment, or pigments producing element carbon when heated above a corresponding pyrolysis temperature;
a carbon precursor to produce elemental carbon via pyrolysis when heated above its thermal decomposition temperature;
metal selected from iron, cobalt, nickel, chromium, manganese, vanadium, tin, zinc, copper, tool steels, ferrous alloys, stainless steels, or an alloy thereof; or
any combination of pigment, carbon precursor, metal, or pigment and metal thereof.

4. The method of claim 1, wherein dispersion of the melting point suppression particles includes a liquid vehicle, wherein the liquid vehicle comprises water, organic co-solvent, and surfactant.

5. The method of claim 1, wherein the discrete location is further defined as having a depth beyond the discrete surface region from about 30 μm to about 500 μm.

6. The method of claim 1, wherein the melting point suppression particles are present within the green body object at the discrete location at an average melting point suppression particle to metal particle weight ratio from about 0.05:100 to about 1:10.

7. The method of claim 1, wherein the layered green body object is heated to a temperature from about 600° C. to about 3,500° C. to fuse the metal particles together and form the fused three-dimensional object.

8. The method of claim 1, wherein the metal particles have a D50 particle size from about 3 μm to about 150 μm, and the melting point fusing particles have a D50 particle size from about 2 nm to about 1,000 nm.

9. The method of claim 1, wherein the metal particles include iron, aluminum, titanium, copper, cobalt, chromium, nickel, vanadium, tungsten, tungsten carbide, tantalum, molybdenum, magnesium, tool steels, ferrous alloys, stainless steels, an alloy thereof, or a mixture thereof.

10. A three-dimensional printing system comprising:
a particulate build material including from about 80 wt % to 100 wt % metal particles having a particle size from about 3 μm to about 150 μm;
a binding agent applicator fluidly coupled or coupleable to a binding agent, wherein the binding agent includes a binder in an aqueous binder vehicle;
a suppression agent applicator fluidly coupled or coupleable to a melting point suppression agent, the melting point suppression agent including a dispersion of melting point suppression particles; and
a hardware controller to generate a command to:
direct the binding agent applicator to iteratively apply the binding agent to the particulate build material to form individually patterned object layers of a green body object, and
direct the suppression agent applicator to iteratively apply the melting point suppression agent to a discrete location of the individually patterned object layers, wherein the discrete location corresponds to include a discrete surface region of the green body object.

11. The system of claim 10, wherein the discrete location of the individually patterned object layers extends beyond the discrete surface region to within a bulk of the green body object to a depth from about 30 μm to about 500 μm.

12. The system of claim 10, further comprising a fusing oven to heat the layered green body object and form a fused three-dimensional object, wherein the melting point suppression agent interacts with the metal particles during heating to form visible mark at a surface of the fused three-dimensional object having increased optical reflectivity compared to other surface locations where the melting point suppression agent was not applied while forming the green body object.

13. The system of claim 10, wherein the metal particles include stainless steel and the melting point suppression particles include carbon black pigment.

14. A metal article comprising:
a sintered metal particle body of a first metal material; and
a metal surface of the sintered metal particle body, wherein the metal surface includes:
a first sintered surface portion of the first metal material; and
a second sintered surface portion including a melting point suppressed-sintered alloy of the first metal material and melting point suppression particles, wherein the second sintered surface portion has a higher optical reflectivity than the first surface portion.

15. The metal article of claim 14, wherein the sintered metal particle body further includes a discrete location with the melting point suppressed-sintered alloy therein, wherein the melting point suppressed-sintered alloy is positioned directly adjacent to the second sintered surface portion and has a depth therefrom ranging from 30 μm to 500 μm.

* * * * *